US012666221B2

(12) United States Patent
Milton et al.

(10) Patent No.: US 12,666,221 B2
(45) **Date of Patent: \*Jun. 23, 2026**

(54) SYSTEM AND METHOD TO COLLECT DEVICE LOCATION CONTEXT WITHOUT THE COLLECTION OF RAW, DETAILED LOCATION DATA AT SCALE

(71) Applicant: PlaceIQ, Inc., New York, NY (US)

(72) Inventors: Stephen Milton, Lyons, CO (US);
Drew Breunig, New York, NY (US)

(73) Assignee: PlaceIQ, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,381

(22) Filed: Feb. 19, 2020

(65) Prior Publication Data

US 2020/0252794 A1    Aug. 6, 2020

Related U.S. Application Data

(63) Continuation of application No. 15/825,809, filed on Nov. 29, 2017, now Pat. No. 10,609,554.

(60) Provisional application No. 62/427,424, filed on Nov. 29, 2016.

(51) Int. Cl.
| | |
|---|---|
| *H04W 4/21* | (2018.01) |
| *G06F 21/62* | (2013.01) |
| *H04W 4/021* | (2018.01) |
| *H04W 4/029* | (2018.01) |
| *H04W 12/02* | (2009.01) |
| *H04W 12/033* | (2021.01) |

(52) U.S. Cl.
CPC ........ *H04W 4/021* (2013.01); *G06F 21/6245* (2013.01); *G06F 21/6263* (2013.01); *H04W*

*4/029* (2018.02); *H04W 12/02* (2013.01); *H04W 12/033* (2021.01); *G06F 2221/2111* (2013.01)

(58) Field of Classification Search
None
See application file for complete search history.

(56) References Cited

U.S. PATENT DOCUMENTS

| | | | | |
|---|---|---|---|---|
| 8,340,691 B1 * | 12/2012 | Starenky | ............... | H04W 4/029 |
| | | | | 455/414.1 |
| 9,063,951 B1 * | 6/2015 | Zhu | ..................... | G06F 16/9574 |
| 9,668,104 B1 * | 5/2017 | Ching | .................... | H04W 4/021 |
| 10,204,499 B1 * | 2/2019 | Newstadt | ........... | G08B 21/0269 |
| 2003/0080997 A1 * | 5/2003 | Fuehren | ................. | G06Q 30/02 |
| | | | | 715/744 |
| 2007/0006098 A1 * | 1/2007 | Krumm | ............... | G06F 16/9537 |
| | | | | 715/825 |

(Continued)

FOREIGN PATENT DOCUMENTS

| | | | | |
|---|---|---|---|---|
| JP | 2004259187 A | * | 9/2004 | |

OTHER PUBLICATIONS

Janice Tsai, et. al."Location-Sharing Technolgoies: Privacy Risks and controls", Aug. 15, 2009 (Year: 2009).*
English Translation of JP 2004259187 A (Year: 2004).*

*Primary Examiner* — Patrick Mcatee
*Assistant Examiner* — Sima Asgari
(74) *Attorney, Agent, or Firm* — KDW FIRM PLLC

(57) ABSTRACT

Provided is a distributed application that shifts certain server-side operations from geolocation analytics platforms to client computing devices to enhance consumer privacy and the collection and use of potentially sensitive, personal data about an individual and their mobile device.

14 Claims, 3 Drawing Sheets

(56) References Cited

U.S. PATENT DOCUMENTS

| | | | |
|---|---|---|---|
| 2007/0008927 A1* | 1/2007 | Herz | H04W 84/18 |
| | | | 370/331 |
| 2010/0075674 A1* | 3/2010 | Lee | H04W 48/20 |
| | | | 455/435.2 |
| 2010/0234045 A1* | 9/2010 | Karr | G01S 5/0009 |
| | | | 455/456.1 |
| 2013/0325399 A1* | 12/2013 | Yuen | H04L 67/535 |
| | | | 702/178 |
| 2014/0129121 A1* | 5/2014 | Fino | G01C 21/3492 |
| | | | 701/400 |
| 2014/0195530 A1* | 7/2014 | Milton | G06F 16/29 |
| | | | 707/734 |
| 2014/0236669 A1 | 8/2014 | Milton et al. | |
| 2015/0067880 A1* | 3/2015 | Ward | H04W 12/02 |
| | | | 726/26 |
| 2015/0237472 A1* | 8/2015 | Alsina | H04W 4/025 |
| | | | 455/456.3 |
| 2015/0350843 A1* | 12/2015 | Jensen | G06Q 10/1095 |
| | | | 455/456.3 |
| 2016/0019465 A1* | 1/2016 | Milton | H04W 4/029 |
| | | | 706/52 |
| 2016/0092699 A1 | 3/2016 | Riva et al. | |
| 2016/0135014 A1 | 5/2016 | Alharayeri | |
| 2016/0337971 A1* | 11/2016 | Bhargava | H04W 52/0216 |
| 2016/0360367 A1 | 12/2016 | Shankaranarayanan et al. | |
| 2017/0041263 A1 | 2/2017 | Shekel | |
| 2017/0199998 A1 | 7/2017 | Bruno et al. | |
| 2017/0249478 A1 | 8/2017 | Lovin | |
| 2017/0331670 A1* | 11/2017 | Parkvall | H04W 24/10 |
| 2017/0337552 A1 | 11/2017 | Mandal et al. | |
| 2017/0339054 A1 | 11/2017 | Yadav et al. | |

* cited by examiner

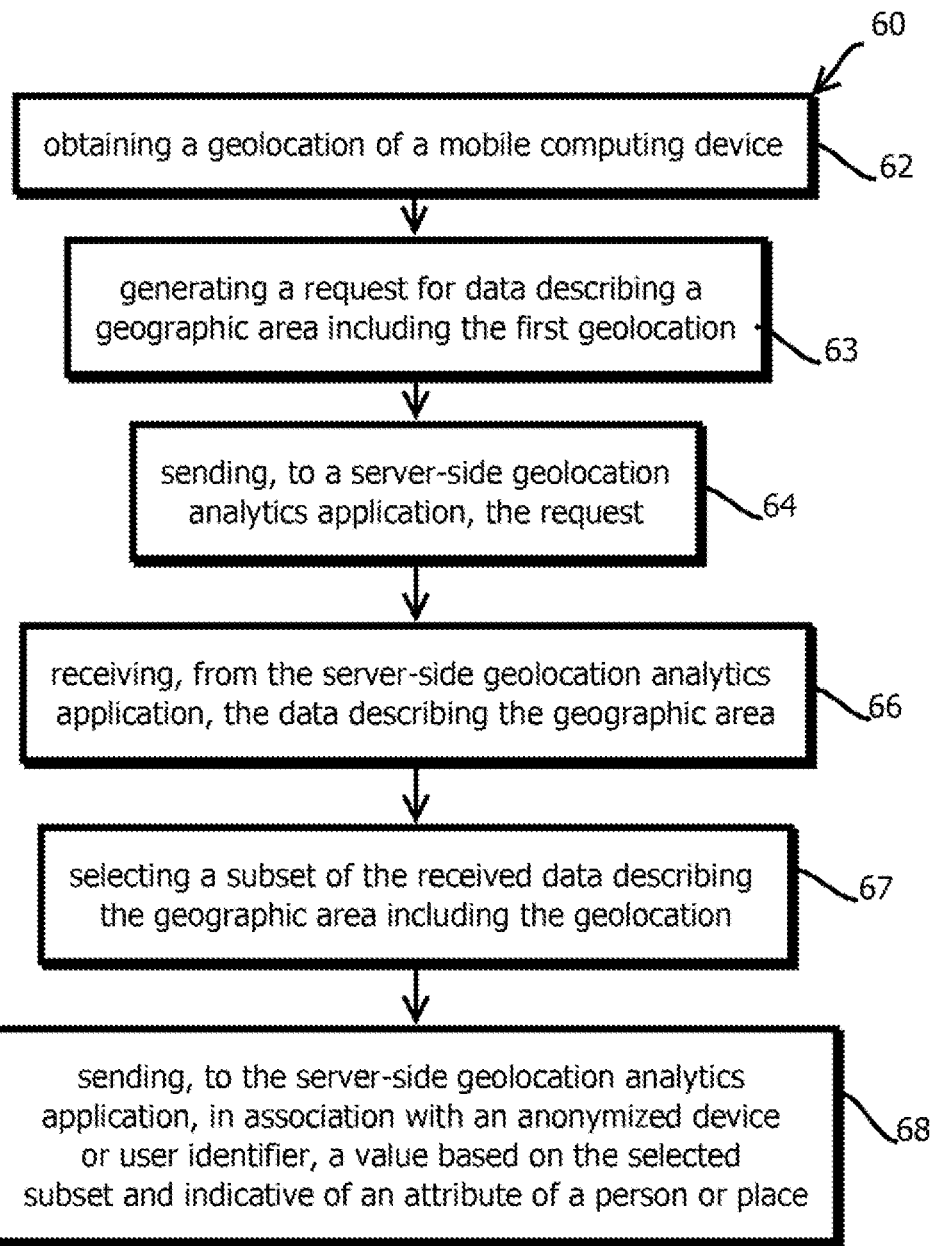

60 obtaining a geolocation of a mobile computing device          62 generating a request for data describing a
geographic area including the first geolocation          63 sending, to a server-side geolocation
analytics application, the request          64 receiving, from the server-side geolocation analytics
application, the data describing the geographic area          66 selecting a subset of the received data describing
the geographic area including the geolocation          67 sending, to the server-side geolocation analytics
application, in association with an anonymized device
or user identifier, a value based on the selected
subset and indicative of an attribute of a person or place          68

FIG. 2

SYSTEM AND METHOD TO COLLECT DEVICE LOCATION CONTEXT WITHOUT THE COLLECTION OF RAW, DETAILED LOCATION DATA AT SCALE

CROSS-REFERENCE TO RELATED APPLICATIONS

The present application is a non-provisional of, and thus claims the benefit of, U.S. Provisional Patent Application 62/427,424, titled SYSTEM AND METHOD TO COLLECT DEVICE LOCATION CONTEXT WITHOUT THE COLLECTION OF RAW, DETAILED LOCATION DATA AT SCALE, filed 29 Nov. 2016. The content of each afore-mentioned patent filing to which priority is claimed is hereby incorporated by reference.

BACKGROUND

1. Field

The present disclosure relates generally to computer systems and, more specifically, to geolocation analytics platforms.

2. Description of the Related Art

The marketing ecosystem is increasingly dependent on mobile devices (phones, tablets, and other mobile-computing devices) to reach consumers with marketing and advertising messaging and to perform other types of location-informed measurement and analytics, such as audience analysis, audience selection, geographic analysis, site selection, site planning, and the like. One of the key methods to reach these consumers (and perform these other analyses) requires the usage of location data generated from the device to contextualize real world consumer behavior associated with the device.

SUMMARY

The following is a non-exhaustive listing of some aspects of the present techniques. These and other aspects are described in the following disclosure.

Some aspects include a process that shifts certain server-side operations from geolocation analytics platforms to client computing devices to enhance privacy.

Some aspects include a process, including: obtaining, with a client-side geolocation analytics application executing on a first mobile computing device among more than 10,000 mobile computing devices executing respective instances of the client-side geolocation analytics application and configured to at least partially anonymously aggregate geolocation analytics in a server-side geolocation analytics application, a first geolocation of the first mobile computing device; generating, with the client-side geolocation analytics application executing on the first mobile computing device, a first request for data describing a geographic area including the first geolocation, wherein: the first request accounts for less than 1% of an amount of data describing geographic areas in a geographic information system of the server-side geolocation analytics application; and the geographic area of the first request does not reveal the first geolocation to the server-side geolocation analytics application with greater specificity than within a kilometer of the first geolocation; sending, with the first mobile computing device, via a network, to the server-side geolocation analytics application, the first request for data describing the geographic area including the first geolocation; receiving, with the first mobile computing device, via the network, from the server-side geolocation analytics application, the data describing the geographic area including the first geolocation; selecting, with the client-side geolocation analytics application executing on the first mobile computing device, a first subset of the received data describing the geographic area including the first geolocation; and sending, with the first mobile computing device, via the network, to the server-side geolocation analytics application, in association with an anonymized device or user identifier, a value based on the selected first subset and indicative of an attribute of a person or place inferred by the first mobile computing device.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 is a flowchart of an example of a process by which privacy may be maintained by implementing certain analyses client-side in the system of FIG. 1 in accordance with some embodiments of the present techniques.

Figure 1:
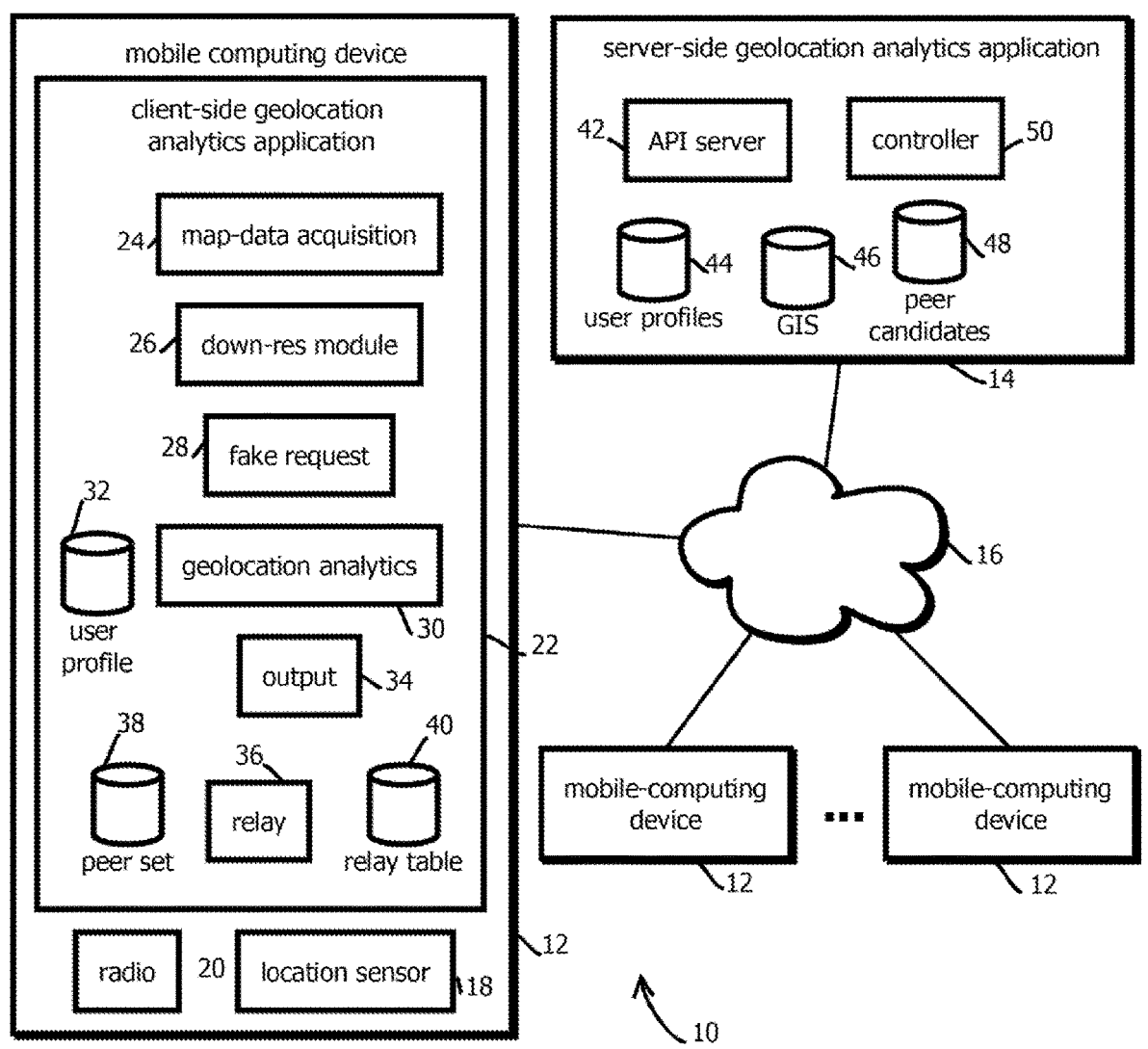
FIG. 1 is a block logical and physical architecture diagram illustrating an example of a computing environment consistent with embodiments of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of geolocation analytics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Raw device location data is increasingly being considered as sensitive, personal data. If future regulations dictate the cessation of raw location data collection, there will be a great need for a new mechanism to allow for the continued collection and use of device behavior and location context without the requirement to disclose or share the raw location data with a third party. There is a need for a mechanism for achieving this goal or otherwise mitigating the related problem.

Hints at possible solutions are not readily apparent in the present landscape. Naive modification and re-use of existing technology is prevented by scaling challenges. In theory, and fully divorced from commercial use, the server-side code and data of traditional geolocation-analytics systems could simply be moved to each client device. But in practice, this is not feasible due to technical problems that arise at scale with commercially relevant systems. Scaling challenges arise with respect to both geographic scale and with respect to the number of client computing devices (e.g., cell phones, tablets, in-dash computers, wearables, and the like).

Geographic scale prevents commercially relevant, traditional systems from merely being shifted to the client device (e.g., user mobile devices from which geolocation measurements are obtained), in part, because the amount of data describing the areas is too large to 1) transfer the data set to the client device with bandwidth constraints of consumer-grade computing devices; 2) store the data client-side with the amount of memory typically available with consumer-grade computing devices; 3) effectively interrogate the data with consumer-grade computing devices with acceptable latency; and 4) update the data client-side. The map data used to describe geographic areas of a size that is useful to industry (e.g., typically entire countries or at least larger metropolitan areas (e.g., of more than 1 million residents and larger than 100 square kilometers)) is generally very large (e.g., often well more than 10 Gigabytes, and in many cases, exceeding a Terabyte). Often this map data is joined with geolocation measurements to make inferences about places or people, but cell phones cannot handle data on this scale.

Similar problems arise due to the number of client-side computing devices at issue. Often, commercially-relevant implementations of location analytics systems process data from more than 1 million devices and often more than 10 or 100 million devices. Sending and updating map data stored on every one of these devices would exceed available bandwidth and processing capacity of many currently available networks and servers.

Solutions to these scaling problems are generally constrained by the privacy-related issues above, at least in some domains. Some techniques exist for caching locally-relevant data client-side, but many of these approaches leak excessive amounts of potentially privacy-sensitive data back to the server. Some existing systems send data relevant to a client-device's current location to the client device for caching based on location-specific queries. But the queries often indicate the client device's exact location to the server, giving rise to the same issues discussed above. That is, the act of requesting relevant map data to use in a client-side analysis reveals the information (i.e. the user's location) that was attempted to be kept private by shifting the analysis to the client device. Thus, privacy and scaling challenges prevent naive repurposing of existing techniques to address the problems above.

None of these descriptions of problems should be read as a disclaimer of scope. Some embodiments mitigate subsets of the problems described, while leaving others unaddressed, as there are several independently useful techniques described herein.

The present techniques may be implemented as part of a distributed geolocation analytics system that collects and stores raw locates to be processed in large batches against a detailed digital base map. Examples of such systems include those described in U.S. patent application Ser. No. 15/152,157, filed 11 May 2016, which claims the benefit of U.S. Provisional Patent Application 62/160,193, titled "PROBABILISTIC JOIN BETWEEN TWO CUSTOMER ACTIVITY DATA SETS," filed 12 May 2015; is a continuation-in-part of U.S. patent application Ser. No. 14/667,371, titled "LOCATION-BASED ANALYTIC PLATFORM AND METHODS," filed 24 Mar. 2015, which claims the benefit of U.S. Provisional Patent Application 61/969,661, titled "LOCATION-BASED ANALYTIC PLATFORM AND METHODS," filed 24 Mar. 2014; is a continuation-in-part of U.S. patent application Ser. No. 15/009,053, titled "APPARATUS AND METHOD FOR PROFILING USERS, filed 28 Jan. 2016, which is a continuation of U.S. Pat. No. 9,275,114, titled "APPARATUS AND METHOD FOR PROFILING USERS," filed 14 Jun. 2013, which is a continuation of U.S. Pat. No. 8,489,596, titled "APPARATUS AND METHOD FOR PROFILING USERS," filed 4 Jan. 2013; is a continuation-in-part of U.S. patent application Ser. No. 13/769,736, titled "Apparatus and Method for Identifying and Employing Visitation Rates," filed 18 Feb. 2013; is a continuation-in-part of U.S. patent application Ser. No. 13/938,974, titled "PROJECTING LOWER-GEOGRAPHIC-RESOLUTION DATA ONTO HIGHER-GEOGRAPHIC-RESOLUTION AREAS," filed 10 Jul. 2013; is a continuation-in-part of U.S. patent application Ser. No. 14/334,066, titled "Matching Anonymized User Identifiers Across Differently Anonymized Data Sets," filed 17 Jul. 2014, which claims the benefit of U.S. Provisional Patent Application 61/847,083, titled "Matching Anonymized User Identifiers Across Differently Anonymized Data Sets," filed 17 Jul. 2013; is a continuation-in-part of U.S. patent application Ser. No. 14/553,422, titled "Apparatus and Method for Determining the Quality or Accuracy of Reported Locations," filed 25 Nov. 2014, which claims the benefit of U.S. Patent Application 61/908,560, titled "APPARATUS AND METHOD FOR DETERMINING THE QUALITY OR ACCURACY OF REPORTED LOCATIONS," filed 25 Nov. 2013; is a continuation-in-part of U.S. patent application Ser. No. 14/802,020, titled "Analyzing Mobile-Device Location Histories To Characterize Consumer Behavior," filed 17 Jul. 2015, which claims the benefit of U.S. Provisional Patent Application 62/026,128, titled "Analyzing Mobile-Device Location Histories To Characterize Consumer Behavior," filed 18 Jul. 2014; and is a continuation-in-part of U.S. patent application Ser. No. 14/886,841, titled "SCRIPTING DISTRIBUTED, PARALLEL PROGRAMS," filed 19 Oct. 2015, which claims the benefit of U.S. Provisional Patent Application 62/066,100, titled "Scripting Distributed, Parallel Programs," filed 20 Oct. 2014. Each listed patent filing is hereby incorporated by reference in its entirety, as the techniques described herein may implemented to perform the described analysis on the described data sets on client computing devices. Various subsets of the data gathering and processing techniques described there may be shifted to client-side operations in accordance with the approaches described below.

As the entity operating the geolocation analytics system is typically not the originator of this geolocation information/app/publisher this process, in many (but not necessarily all)

commercial implementations, requires the transmission of raw location data from the source to the entity operating the geolocation analytics system and the storage (even if temporarily) of this information. This is an example of a process which, in traditional implementations, may fall under non-transmission/non-storage requirements of sensitive, personal data in the future, even though this system produces output that is not personally identify an individual. Examples of the outputs of the system include:

a. Expressing the likelihood of a person or device visiting a certain type of location (e.g., a Walmart™ store) but not identifying the individual or indicating the exact store or location visited b. Expressing the number of people or devices that visited a type of location (e.g., Walmart™ stores) over a period of time c. Expressing they types of consumer behaviors associated with people that visited a type of location over a period of time In order to achieve these same or similar outputs without collecting raw location data (or while reducing the amount collected relative to traditional techniques) at a centralized application (e.g., server-side in a traditional geolocation analytics system), a modified approach is provided in detail and implemented in some embodiments. Some embodiments avoid (or reduce the amount of) information about each user's geolocation history available server-side in a geolocation analytics system.

Some embodiments provide a service (e.g., with a remote server, like the geolocation analytics systems described in the applications incorporated by reference) to the device-based software (e.g., a mobile application executing as a background process) that captures the location data (e.g., the background process may be implemented with a mobile application, mobile software development kit, or mobile operating system). This service may send a (e.g., small, like less than 1%, and in some cases, less than 0.01%) subset of the global base map (e.g., the time tiles, place polygon's, and related attributes in the applications incorporated by reference) from the server-side of the geolocation analytics system to each device (e.g., mobile computing device) during a user session (e.g., when the mobile computing device is actively measuring geolocation).

Some embodiments may host a server-side geographic information system (GIS), e.g., with a digital base map with annotations and descriptions about the features of specific locations, such as polygons and tiles, which can range in resolution down to 100 m×100 m, and in other cases, consist of place designations which are overlaid thereon or used instead, e.g., with polygons corresponding to specific places of interest, defined with vertices in lat-long format. The mechanism (e.g., a mobile application and server running collectively as a distributed application) may provide (e.g., request from the remote server and store in cache memory of the client) only a small (e.g., less than 10, less than 100, less than 1,000, or less than 10,000) set of polygons, tiles, or points of interest to the device software during a user session. The device-based software (e.g., based on code executing on a mobile device) may send to the service a request with either the raw location "anonymized" to an acceptable level of resolution (e.g. less than 300 m, less than 1 km, or less than 10 km, or less than a threshold probability within such a resolution, like less than 50% probability, less than 10%, or less than 0.5% chance that the device is within an area of one of these sized geographic areas) or express the current location in which the device is located. The latter may be calculated using a small software application installed on the mobile device-based operating system or within a separate application (e.g., the client application) that translates the raw location of the user's mobile device to its associated GIS mapped location. Alternatively, or additionally, other embodiments may obfuscate the location of the client device from the server with other techniques, e.g., with "dummy" queries for locations in areas in which the device is not currently located, so that an observer at the server does not know whether a query indicates a current location or a fake query.

Once the location of the device is expressed, in some embodiments, the service passes a small set (e.g. 50 tiles, or one square kilometer of data) of the digital base map to the device software application. Then, in some embodiments, the device software application continues to collect all raw locates during the session. Or if the device-based software is "always on," meaning continuously collecting location data (e.g., every 500 milliseconds), the information could be sent during discrete time periods (e.g. every 10 minutes), in some embodiments.

At the session end (or time period), the client device software application calls a small client-side piece of logic installed as part of the client-side application, in some embodiments. This user context software, in some embodiments, performs a calculation of the location of the sessions from the raw locates collected. For example, it may determine the device was stationary and, in response, uses the centroid of all locates (e.g., within a threshold duration of time or space) as the most likely location of the device. Or it may determine the device was moving and creates a vector representing the movement. From this base, the software application (e.g., executing client side software) may perform a lookup against the digital base map (i.e., the subset of the GIS data downloaded to the client device) on the client side. From this lookup, it may express potential context of the session (e.g., by joining the geolocation data measured by the mobile computing device with the base map data), in some cases, entirely client-side, without the context being determined by a centralized server, and without the specific location of the client device being indicated to the server. For example, the client-side application may specify with a message to the server of the geolocation analytics system that the device was at a store type (visit), or that the device was driving by a type of store (path/trajectory). The server of the geolocation analytics system may aggregate these results in anonymized user, audience, device, or place profiles. Finally, in some embodiments, the only piece of information passed back to server of the geolocation analytics system's data store (e.g., the aforementioned profiles) is this final "context graph" related to the mobile device session along with the device id (e.g., ADD or UDID) and time stamp. This includes, in some cases, device visits or exposures (drive by) determined from the aforementioned join operations.

Some embodiments may address certain "edge cases" for this data collection. If time period based, in some embodiments, each discrete set of locates may not represent the completion of a visit or trajectory. So, the client-side software may also cache several time periods results in order to identify context that took longer than the defined time period. For example, a time period may be set to 10 minutes. But a client-side user might be at a store visiting for 30 minutes. So, this method is expected to allow the recognition of the continuation of the visit across time periods, in some embodiments. While this could be accomplished server side by matching the individual visits, there is value to doing this client-side. The software application may cache the raw locates in addition to the context for each time period. The additional value is expected to be a more precise centroid for the visit using the method defined in (patent on dynamic distancing), or a more precise trajectory using similar clustering analysis on data for a moving device. This is expected to improve the precision of the context results, the embodiments are not limited to implementations providing this benefit, or any of the other benefits described herein, which is not to imply that any other feature is limiting.

FIG. 1 shows an example of a computing environment 10 in which the above-describe techniques may be implemented. In some embodiments, the computing environment 10 may include a server-side geolocation analytics application 14 that communicates via the Internet 16 with a population of mobile computing devices 12 to effectuate the above-described operations. In some embodiments, the number of mobile-computing devices 12 may be greater than 100, greater than 10,000, greater than 100,000, and in many commercially relevant use cases, greater than 1 million or 10 million mobile user computing devices distributed over a relatively large geographic area, like North America or the world. In some embodiments, the mobile computing devices may be respective smart phones or other mobile computing devices, like tablets or in-dash automotive computers, of different users. In some embodiments, the different computing devices shown in FIG. 1 may have the features of the computing device described below with reference to FIG. 3 or in the applications incorporated by reference.

In some embodiments, each of the mobile computing devices 12 may have installed thereon a client-side geolocation analytics application 22, for instance, downloaded from a central repository, like an application store hosted by a provider of an operating system of the respective mobile computing device 12, and installed thereon. Further, each of the mobile computing devices 12 may include a radio 20 operative to communicate via the network 16 and a location sensor 18 operative to determine the geolocation of the mobile computing device 12.

In some embodiments, each instance of the client-side geolocation analytics applications 22 may include a map-data acquisition module 24, a down resolution module 26, a fake requests module 28, a geolocation analytics module 30, an output module 34, a user profile repository 32, a relay module 36, a peer set data repository 38, and a relay table 40. In some embodiments, these components may cooperate to effectuate the above-describe client-side operations.

In some embodiments, the down resolution module 26 may be operative to receive a geolocation of the mobile computing device, for example, from the location sensor 18, by polling the location sensor 18 or subscribing to events indicative of changes in location from an operating system of the mobile computing device 12. In some embodiments, the down resolution module 26 may collect a plurality of such locations over time, for example, during a session in which the geolocation of the mobile computing device 12 is being measured with the location sensor 18. In some embodiments, the acquired geolocations may be time stamped latitude and longitude measurements indicative of a geolocation of the mobile computing device. In some embodiments, the down resolution module 26 may be configured to determine a lower-resolution expression of the obtained geolocation to be supplied to the map-data acquisition module 24 to obtain map data including the obtained geolocation.

In some embodiments, the down-resolution module 26 may determine a geographic area that surrounds or otherwise includes the obtained geolocation. Examples include specifying a geographic area within a threshold distance of a center point, which may be different from the obtained geolocation, like a randomly selected value within a threshold distance. Or, some embodiments may determine a lower-resolution expression of a geographic area that does not implicitly indicate the obtained geolocation as a center point by other means, for example, by identifying a tile or other grid square that includes the obtained geolocation. Examples include identifying a 1 km×1 km grid square, 10 km×10 km grid square, or 100 km×100 km grid square or larger or smaller. In some embodiments, the down-resolution module may output a description of a geographic area that does not indicate the geolocation of the mobile computing device with greater specificity than within 1 km, 10 km, 100 km, or more of the actual geolocation of the mobile computing device.

In some embodiments, the down-resolution module 26 may send the expression of the geographic area to the map-data acquisition module 24, which may request map data within the geographic area (e.g., all data of a certain or any type in the area) from the server-side geolocation analytics application 14. In some embodiments, this request may be expressed as an identifier of one of the above-described grid squares or as a center point and radius or as a bounding polygon having vertices expressed as latitude and longitude values. In some embodiments, the request may be sent with an anonymized identifier of the mobile computing device or without and an identifier of the mobile computing device 12. In some embodiments, the request may be sent directly to the server-side geolocation analytics application 14 from the client-side geolocation analytics application 22 via the Internet 26.

Or in some cases, the relay module 36 described below may cooperate with relay modules in other mobile computing devices 12 to relay the request across one or more peer to peer hops among the mobile computing devices 12 having the client-side geolocation analytics application 22 installed before the request reaches the server-side geolocation analytics application 14. In some cases, these hops may be direct wireless connections via mobile computing devices or some embodiments may relay the hops over the Internet 16, in some cases potentially relaying to other mobile computing devices relatively far away, for example, in another state, like more than to 10 km away, 100 km away, or further, such that the server-side geolocation analytics application 14 does not communicate directly with the mobile computing device 22 making the request and cannot infer a geolocation of the mobile computing device 12 initiating the request, for example, from sender IP address values in headers of Internet Protocol packets conveying the request to the server-side geolocation analytics application 14. In some cases, responses may be sent back through the multiple hops as described below.

In some embodiments, the application 22 may be configured to submit fake requests with the fake requests module 28, for example, periodically or randomly, for instance, pseudorandomly, like based on a linear shift register output or randomization function of a central processing unit of the mobile computing device 12. In some embodiments, the fake requests module 28 may be configured to generate requests for map data via the map data acquisition module 24 that request map data at a geolocation different from a geolocation at which the mobile computing device 12 is disposed, thereby obfuscating to the server-side application which requests are indicative of the true geolocation of the mobile computing device 12 and which are requests for falsified geolocations. In some embodiments, the fake requests module 28 may be configured to request map data with fake requests that correspond to a probability distribution of requests over a geographic area, for example, with a greater likelihood of requesting map data in areas with higher population density. In some embodiments, the fake requests module 28 may store in memory a probability distribution of geolocations of a population over a geographic area, and some embodiments may sample geolocations from that probability distribution by randomly selecting according to the probability, such that geographic areas in populous cities have a higher probability of being selected for fake requests, while geographic areas in the middle of oceans or sparsely populated areas have a low probability of being selected, thereby making it difficult to detect fake requests server side and increasing the effectiveness of the fake requests in obfuscating the location of the mobile computing device 12.

In some embodiments, the map data may be returned to the client-side geolocation analytics application 22 via the path with which the data was requested, and that received map data may be joined with the measured geolocation of the mobile computing device by the geolocation analytics module 30 to make the above-describe inferences about people or places. In some embodiments, this may include receiving map data describing tiles, time tiles, places of interest, and the like described in the applications incorporated by reference within the geographic area specified by the down resolution module 26 and included in the map data request from the acquisition module 24. In some embodiments, the geolocation analytics module 30 may determine a subset of the map data that is relevant to the measured geolocation of the mobile computing device, for example, identifying tiles in which the geolocation is disposed, or identifying places of interest in which the geolocation is disposed.

In some embodiments, the geolocation analytics module 30 may aggregate measured geolocations in the manner described above, for example, calculating a centroid or other measure of central tendency and selecting among the geolocation data to identify relevant geolocation data based upon the aggregate measures of geolocation. In some embodiments, the geolocation analytics module may cluster the geolocation data, for example, with a density-based clustering algorithm, in some cases clustering based on geolocation and time to identify a plurality of clusters. Some embodiments may then operate upon respective measures of central tendency for the various clusters or convex hulls of the clusters to identify subsets of the geolocation data, for example, subsets of the geolocation data corresponding to geographic areas within or overlapping the convex hulls or including the centroids.

Some embodiments may execute a density-based clustering algorithm, like DBSCAN, to establish groups corresponding to the resulting clusters and exclude outliers. To cluster according to timestamped measured geolocation, some embodiments may iterate through each of the geolocations measured and designate a geolocation as a core geolocation if at least a threshold number of the other geolocations in the records are within a threshold distance. Some embodiments may then iterate through each of the core geolocations and create a graph of reachable geolocations, where nodes on the graph are identified in response to non-core corresponding geolocations being within a threshold distance of a core geolocation in the graph, and in response to core geolocations in the graph being reachable by other core geolocations in the graph, where two geolocations are reachable from one another if there is a path from one geolocation to the other geolocation where every link and the path is a core geolocation and is within a threshold distance of one another. The set of nodes in each resulting graph, in some embodiments, may be designated as a cluster, and points excluded from the graphs may be designated as outliers that do not correspond to clusters. In some embodiments, the resulting clusters may be a local optimum resulting, and different initial conditions (e.g., different initial point selections) may yield better (e.g., with a smaller sum of root-mean-square distances between centroids and vectors) clusters. Accordingly, some embodiments may repeat the clustering process multiple times (e.g., more than five times) with different initial point selections (e.g., different random selections) and select a resulting set of clusters having the best clusters by the aforementioned measure.

A measured geolocation be determined to be within a geofence with a variety of techniques. In some cases, the entities in the map data may be defined by a center point (e.g., a latitude and longitude) and a radius, and some embodiments may calculate a distance between the centerpoint and a measured geolocation and determine whether the measured geolocation is within the geofence by comparing the distance to the radius, with distances exceeding the radius indicating the current location is outside of the geofence. In some cases, the entity in the map data may be defined by a polygon having latitude and longitude vertices. Some such embodiments may execute a ray-casting algorithm or a winding number algorithm to determine whether a current location is within a place of interest. For instance, some embodiments may determine whether a measured geolocation is within a polygon corresponding to a place of interest by counting a number of times a ray originating at the measured geolocation intersects a side of a polygon defining a place of interest and, then, determining whether the measured geolocation is within the place of interest based on whether the count is odd (corresponding to being inside) or even (corresponding to being outside). In some such implementations, every edge of the polygon may be tested for intersection with the ray, and vertices may be tested for intersection with the ray and tracked in memory as already having been deemed intersected to avoid double counting of vertices for adjacent sides. Alternatively, or additionally, the current location may be compared to a place of interest by summing angles between rays extending from the measured geolocation and vertices defining each sequential side of the polygon. Some embodiments may deem the current location to be inside the geofence in response to determining that the sum is non-zero. Some embodiments may calculate such angles according to an inverse trigonometric function, or to expedite processing and avoid computationally expensive calculations, some embodiments may leverage the closed shape of the polygon and simply account for which quadrant each additional edge places each sum.

In some embodiments, the aggregation may include calculating vectors, for example between clusters, like between centroids of clusters or between measure geolocations to infer paths traveled by the mobile computing device. Some embodiments may compare those vectors, or various other paths, to the map data that is acquired and select a subset, for example, by determining which places of interest or tiles are within a threshold distance of the path and designating those items is having been passed by the mobile computing device 12.

Some embodiments of the geolocation analytics module 30 may update user profiles or population audience profiles based on the selected data. Some embodiments may update a profile of the user in the user profile repository 32 based upon attributes of the selected tiles or other places of interest, attributing attributes of these places to the user in the manner described in the applications incorporated by reference. Some embodiments may modify attributes of the tiles or places based upon attributes of the user visiting those places. For example, some embodiments may calculate an adjustment that attributes aspects of the user profile to these places. For instance, some embodiments may determine a sample size of existing measurements of attributes of the places (e.g., included in the map data) and some embodiments may calculate a weighted adjustment based on that sample size in the user profile, decreasing an amount of adjustment based upon the existing sample size and increasing an amount of adjustment based on a difference between a measurement of the attribute associated with the place and a measurement of the attribute attributable to the user in the user profile 32.

In some embodiments, the user profile 32 may include the attributes of the user profile in the applications incorporated by reference above for the user of the client-side geolocation analytics application. In some embodiments, only relatively low-resolution demographic data may be reported back to the server-side geolocation analytics application for the privacy related reasons discussed above, or some embodiments may maintain relatively high-resolution user profile server-side as well, which is not to suggest that any other feature described is limiting.

In some embodiments, the results of the geolocation analytics module 30 may be reported back to the server-side geolocation analytics application 14 via the output module 34. In some embodiments, the direct or indirect communication techniques described above may be engaged by the output module 34 to communicate these resulting values, for example, communication may be direct or indirect via one or more hops across other mobile computing devices 12. In some embodiments, the reported values may include an updated place visitation rate for a place visited, an updated place passing rate for places passed, finer-grained versions of these rates calculated according to the demographics or psychographics in the user profile (e.g., amounts of males between ages 50 and 55 that have greater than a threshold affinity for golf that visit a place on a weekend), updated attributes of places visited or passed that attribute attributes of the user to the places, or the like. In some embodiments, these values may be received by the server-side geolocation analytics application and corresponding records may be updated in the map data in some cases.

As indicated, some embodiments may obfuscate the network address of the mobile computing device 12 from the server-side geolocation analytics application 14 with a peer to peer multi-hop relaying of communication between the mobile computing device 12 and the server-side geolocation analytics application 14. Various techniques may be implemented to obfuscate the identity or location of the mobile computing device 12. In some embodiments, communications may be sent in association with a temporary session identifier that is discarded (and without a device or user identifier that can be used to correlate between sessions). Or in some embodiments, an anonymized device or user identifier that does not reveal an identity of the user may be sent.

Addressing and routing may be implemented with a variety of techniques. In some embodiments, upon a client-side geolocation analytics application launching or being installed, some embodiments may send an address, such as an IP address, device identifier by which an address may be looked up, phone number, or the like, to the server-side geolocation analytics application as part of a registration process. In some embodiments, the server-side geolocation out analytics application may maintain in memory a list of these addresses and in some cases, values indicating whether the corresponding application is currently running, for instance, based upon a heartbeat signal, changing the designation in response to not receiving a heartbeat signal in a threshold duration of time, or based upon periodic polling, changing the designation in response to the absence of a response to polling requests within a threshold duration of time.

In some embodiments, the mobile computing device may send a request, at the instruction of the client-side application, to the server-side application, for a peer set to populate the peer set repository 38. In some cases, the server-side geolocation analytics application may select, for example, randomly, among the active instances stored in memory and send a list of addresses to the client-side application. In some cases, this list of addresses may be relatively large, for example, more than 100, more than 1000, or more than 10,000 addresses. Relaying devices may be selected client-side among this set, such that the probability of a given request from a given mobile computing device that relays to the server-side application being correctly attributed to any one mobile computing device has a relatively low probability, such as less than 1 in 1000, 1 in 10,000, 1 and 100,000, or 1 and 1 million, for instance, across one, two, three, or more hops.

In some embodiments, when attempting to communicate with the server-side application, the mobile computing device relay module 36 may randomly selected address from the peer set 38 and send a request, for example, to store output data or for map data, to an address of a peer mobile computing device executing instance of the client side geolocation analytics application 22. A corresponding relay module in that mobile computing device may then relay the message to the server-side application, in some cases stripping identifying metadata, like the IP address of the mobile computing device 12, user agent field data of the mobile computing device 12, MAC addresses of the mobile computing device 12, and the like that originated the request.

In some embodiments, the relaying mobile computing device may create a record in memory, like a unique session identifier sent in association with the related request and attached by the server-side application to responses. In some cases, these records may be stored in memory in a lookup table, like the relay table 40, such that the relaying mobile computing device may associate responses and send them back to an address of the originating mobile computing device 22 (or next device in a multi-hop route). In some embodiments, the process may be repeated across multiple hops across multiple mobile computing devices to further decrease the probability of a given communication to the server-side geolocation analytics application being correctly associated with the originating mobile computing device 12. Or in other cases, decentralized address discovery may be implemented, e.g., with a distributed hash table.

In some embodiments, steps may be taken to conceal information from relaying mobile computing devices. In some embodiments, an originating mobile computing device may encrypt the content of communications, like requests for map data or output, with encryption key that renders the content of the message inaccessible to relaying mobile computing devices but accessible to the server-side geolocation analytics application. In some embodiments, the messages may be encrypted with a public key of the server-side geolocation analytics application, which may correspond to a private key, for example, in an elliptic curve encryption protocol, and in some cases the server-side geolocation analytics application may decrypt the message with the private key.

In some embodiments, the sent messages, such as sent messages encoding requests, may be sent with a one-time ephemeral public key using a similar encryption protocol created by the mobile computing device 12 originating request, and the server-side geolocation analytics application may encrypt responses with that public key, such that the mobile computing device 12 may decrypt the results with the ephemeral private key. In some cases, the ephemeral public and private keys may be discarded between requests or between sessions, such that different sessions over time cannot be correlated by the server-side geolocation analytics application 14, to further enhance privacy, though embodiments are not limited to systems providing this benefit, which is not to suggest that any other description is limiting.

In some embodiments, instead of or in addition to maintaining the relay tables 48, for relay nodes to determine where to send responses in a given session or exchange, some embodiments may embed addresses along a route in different layers of encryption applied at different relaying nodes. In some embodiments, on a route from an originating mobile computing device 12 to the server-side geolocation analytics application 14, along each hop, each mobile computing device relay module 36 may encrypt both the received message, which may be an encrypted ciphertext from an upstream relaying mobile computing device and an address of that relaying mobile computing device forming a current layer of encryption. The resulting ciphertext at the last relaying node may send a resulting, multilayer encrypted blob to the server-side geolocation analytics application, which may then send back that encrypted blob, and each mobile computing devices relay module may decrypt a respective layer and identify an address in the resulting plain text using a cryptographic key stored in memory (an unavailable to other devices), such as a symmetric cryptographic key. The identified address may be an address along a route across multiple hops back to the originating mobile computing device.

In some embodiments, the server-side geolocation analytics application 14 may include an application program interface server 42, a user profile repository 44, a geographic information system 46, peer candidates list 48, and a controller 50 that may coordinate the operation of the server-side geolocation analytics application 14. In some embodiments, the API server 42 may be a nonblocking server configured to receive requests, route those request into the controller 50, and send responses back, either directly or indirectly to originating mobile computing devices 12.

In some embodiments, the user profiles repository 44 may store audience records or user profile records, in some cases with lower specificity or less data than corresponding user profiles stored in user profile repository 32 client-side. In some embodiments, these server-side user profiles may be updated based upon the output received from the output module 34, and in some cases the user profiles may be identified by an anonymized user identifiers or device identifiers and not be de-anonymized identifiers.

In some embodiments, the geographic information system 46 may store the above-described requested map data, for example for a relatively large geographic area, like North America or the world. In some embodiments, updates from the output module 34 changing attributes of places may be stored in the geographic information system 46 as those updates are received.

In some embodiments, the pure candidate repository 48 may store the above-described set of peer candidates by which the pure sets 38 are populated and in some cases state information indicating whether the respective peer mobile computing devices 12 are currently executing and instance of the client-side geolocation analytics application and are operative to relay messages. In some embodiments, upon request to relay messages not receiving an acknowledgment response within a threshold amount of time, different relay mobile computing devices may be selected.

FIG. 2 is a flowchart of a process 60 that may be implemented in the above-describe system. In some embodiments, the described functionality of FIG. 2 and described above may be implemented by executing instructions stored on a tangible, non-transitory, machine-readable medium, for instance with one or more processors. In some embodiments, different subsets of the instructions may be stored in different computing devices and executed by different processors, an arrangement consistent with use of the singular term "medium" herein. In some embodiments, the operation mediations may be due executed in a different order, operations may be inserted, operations may be omitted, some operations may be executed concurrently, sent the operations may be executed serially, or the process may be otherwise differently arranged, none of which is to suggest that any other description herein is limiting. In some embodiments, the process 60 may be executed by one of the above-described instances of the client-side geolocation analytics application executing on a mobile computing device 12.

In some embodiments, the process 60 begins with obtaining a geolocation of a mobile computing device, as indicated by block 62. Some embodiments may then generate a request for data describing a geographic area including the geolocation, as indicated by block 63. In some embodiments, this may include the above-describe down razzing process and including various fake requests interspersed between legitimate requests. In some embodiments, the process include sending, to a server-side geolocation analytics application, the request, as indicated by block 64. In some cases, request may be sent directly or indirectly across multiple hops, as described above. Some embodiments include receiving, from the server-side geolocation analytics application, the dated describing the geographic area, as indicated by block 66. In some cases the data that's received may be received directly or indirectly across multiple hops, as described above. Some embodiments may then select a subset of the received data describing the geographic area that includes the geolocation, as indicated by block 67. Or in some cases, the subset may be adjacent the geolocation or a vector determined based on the geolocation. In some embodiments, selecting may include a joint operation between a geolocation history of the mobile computing device and the obtain map data. Some embodiments may calculate the above-describe geolocation analytics on people and places based on the selected subset. Some embodiments may then send, to the server-side geolocation analytics application, in association with an anonymized device or user identifier, a value based on the selected subset and indicative of an attribute of a place or person, as indicated by block 68. Again, sending may be direct or indirect across multiple hops. The value may be one of the result to the above-described geolocation analytics calculations described above. In some embodiments, the resulting value stored at the server-side geolocation analytics application may use in the manner described in the applications incorporated by reference, for example to bid on advertisement auctions, for site selection, determining place visitation rates, and various other purposes.

Figure 3:
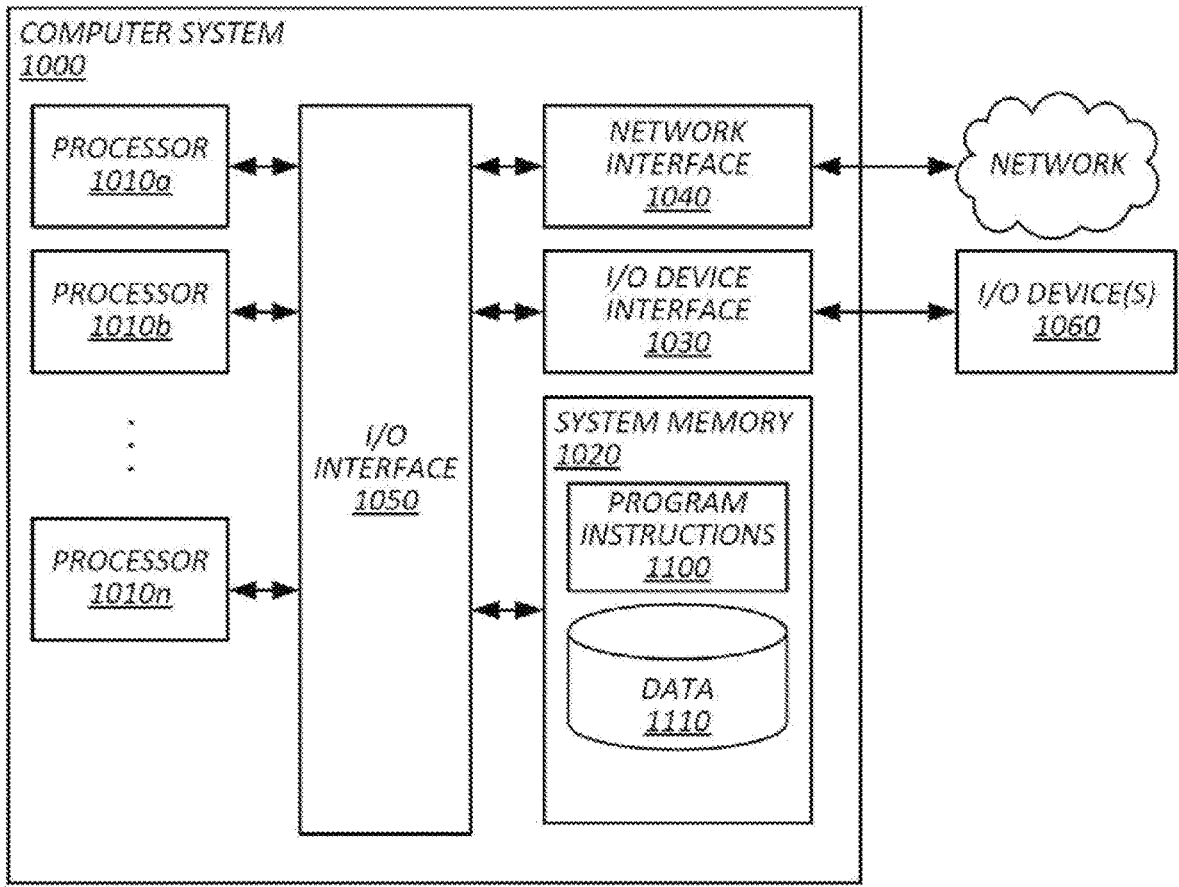
FIG. 3 is an example of a computing system by which the present techniques may be implemented.

FIG. 3 illustrates an example of a general purpose computer system by which the present techniques may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors $1010a$-$1010n$) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., $1010a$-$1010n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors $1010a$-$1010n$) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors $1010a$-$1010n$) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpindicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations comprising: obtaining, with a client-side geolocation analytics application executing on a first mobile computing device among more than 10,000 mobile computing devices executing respective instances of the client-side geolocation analytics application and configured to at least partially anonymously aggregate geolocation analytics in a server-side geolocation analytics application, a first geolocation of the first mobile computing device; generating, with the client-side geolocation analytics application executing on the first mobile computing device, a first request for data describing a geographic area including the first geolocation, wherein: the first request accounts for less than 1% of an amount of data describing geographic areas in a geographic information system of the server-side geolocation analytics application; and the geographic area of the first request does not reveal the first geolocation to the server-side geolocation analytics application with greater specificity than within a kilometer of the first geolocation; sending, with the first mobile computing device, via a network, to the server-side geolocation analytics application, the first request for data describing the geographic area including the first geolocation; receiving, with the first mobile computing device, via the network, from the server-side geolocation analytics application, the data describing the geographic area including the first geolocation; selecting, with the client-side geolocation analytics application executing on the first mobile computing device, a first subset of the received data describing the geographic area including the first geolocation; and sending, with the first mobile computing device, via the network, to the server-side geolocation analytics application, in association with an anonymized device or user identifier, a value based on the selected first subset and indicative of an attribute of a person or place inferred by the first mobile computing device.

2. The medium of embodiment 1, wherein the operations comprise: obtaining, with the client-side geolocation analytics application executing on the first mobile computing device, a second geolocation of the first mobile computing device different from the first geolocation; determining, with the client-side geolocation analytics application executing on the first mobile computing device, that the second geolocation is within the geographic area; selecting, with the client-side geolocation analytics application executing on the first mobile computing device, a second subset of the received data describing the geographic area based on the second geolocation, the second subset being different from the first subset; and sending, with the first mobile computing device, via the network, to the server-side geolocation analytics application, in association with the anonymized device or user identifier, another value based on the selected second subset and indicative of an inferred attribute of a person or place.

3. The medium of any one of embodiments 1-2, wherein: the geographic area of the first request does not reveal the first geolocation to the server-side geolocation analytics application with greater specificity than within ten kilometers of the first geolocation.

4. The medium of any one of embodiments 1-3, wherein the operations comprise: obtaining, with the client-side geolocation analytics application executing on the first mobile computing device, a fake geolocation that is not indicative of a geolocation of the first mobile computing device; generating, with the client-side geolocation analytics application executing on the first mobile computing device, a second request for data describing a geographic area including the fake geolocation; sending, with the first mobile computing device, via the network, to the server-side geolocation analytics application, the second request for data describing the geographic area including the second geolocation to obfuscate the geolocation of the first mobile computing device to the server-side geolocation analytics application.

5. The medium of any one of embodiments 1-4, wherein: the data describing the geographic area including the first geolocation comprises a plurality of polygons corresponding to a plurality of places of interest; and each polygon is associated with designation in an ontology of places of interest indicating a type of the respective place of interest.

6. The medium of embodiment 5, wherein: selecting the first subset comprises determining that the first geolocation is within a selected one of the polygons; and the operations comprise adjusting: a profile of a given place of interest corresponding to the selected one of the polygons based on a profile of a user of the first mobile computing device; or a profile of the user of the first mobile computing device based on a type in the ontology associated with the given place of interest.

7. The medium of any one of embodiments 1-6, wherein: the data describing the geographic area including the first geolocation comprises a plurality of regularly shaped tiles; and each tile is associated with a plurality of attributes and corresponding scores indicative of an applicability of respective attributes to the respective tile.

8. The medium of embodiment 7, wherein the operations comprise: selecting, with the client-side geolocation analytics application executing on the first mobile computing device, the first subset comprises determining that the first geolocation is within a selected one of the tiles; adjusting, with the client-side geolocation analytics application executing on the first mobile computing device, an attribute of the selected one of the tiles based on a client-side stored profile of a user of the mobile computing device; and updating, with the server-side geolocation analytics application, a record corresponding to the selected one of the tiles in the geographic information system based on the adjustment.

9. The medium of any one of embodiments 1-8, wherein the operations comprise: obtaining a plurality of geolocations over time measured by the first mobile computing device; clustering, with the first mobile computing device, the plurality of geolocations into a cluster with a density-based clustering; degerming, with the first mobile computing device, a measure of central tendency of the cluster; and using the measure of central tendency as the first geolocation.

10. The medium of embodiment 9, wherein: density based clustering is based on density in both time and geolocation; and the operations comprise: determining, with the first mobile computing device, that the measure of central tendency corresponds to a place of interest; and designation, with the first mobile computing device, the place of interest as having been visited by a user having an attribute of a user of the first mobile computing device.

11. The medium of any one of embodiments 1-10, wherein the operations comprise: determining, with the first mobile computing device, a vector of movement of the first mobile computing device; determining, with the first mobile computing device, that a given place of interest in the data describing the first geographic area is within a threshold distance from the vector; and designing the given place of interest as having been passed by a user.

12. The medium of any one of embodiments 1-11, wherein the operations comprise: steps for analyzing geolocation histories client-side.

13. The medium of any one of embodiments 1-12, wherein: sending the first request for data describing the geographic area including the first geolocation comprises: sending the first request from the first mobile computing device to another instance of the client-side geolocation analytics application executing on a second mobile computing device among more than 10,000 mobile computing devices before the first request is provided to the server-side geolocation analytics application; and sending the first request, from the second mobile computing device, to the server-side geolocation analytics application, such that the request is conveyed to the server-side geolocation analytics application without indicating an Internet Protocol address of the first mobile computing device to the server-side geolocation analytics application.

14. The medium of embodiment 13, wherein the operations comprise: encrypting, with the first mobile computing device, the first request with an encryption key that renders the first request inaccessible to the second mobile computing device and accessible to the server-side geolocation analytics application.

15. The medium of embodiment 13, wherein the operations comprise: receiving the first request with the second mobile computing device; associating, with the second mobile computing device, the first request with an anonymized, unique identifier in memory of the mobile computing device and an address of the first mobile computing device; sending the first request in association with the anonymized, unique identifier to the server-side geolocation analytics application from the second mobile computing device; receiving, with the second mobile computing device, the data describing the geographic area based on the first geolocation and the anonymized, unique identifier from the server-side geolocation analytics application before the data is provided to the first mobile computing device; retrieving the address of the first mobile computing device from memory of the second mobile computing device based on the anonymized, unique identifier with the second mobile computing device; and sending the data describing the geographic area from the second mobile computing device to the address of the first mobile computing device.

16. The medium of embodiment 13, wherein the operations comprise: receiving, from the server-side geolocation analytics application, with the first mobile computing devices, addresses of more than 10 other mobile computing devices having instances of the client-side geolocation analytics application, the more than 10 other mobile computing devices including the second mobile computing device; and randomly or pseudorandomly selecting, with the first mobile computing device, from among the addresses of more than 10 other mobile computing devices, an address of the second mobile computing device before sending the first request from the first mobile computing device to another instance of the client-side geolocation analytics application executing on the second mobile computing device.

17. The medium of any one of embodiments 1-16, wherein the operations comprise: steps for obfuscating a network address of the first mobile computing device from the server-side geolocation analytics application by routing the request through one or more other mobile computing devices executing an instance of the client-side geolocation analytics application.

18. The medium of any one of embodiments 1-17, wherein the operations comprise: routing communications between the client-side geolocation analytics application executing on the first mobile computing device and the server-side geolocation analytics application through one or more other instances of the client-side geolocation analytics application selected such that the server-side geolocation analytics application does not receive information sufficient correlate a given one of the communications with the first mobile computing device with greater than a 1 in 100,000 probability.

19. The medium of embodiment 19, wherein the operations comprise: at each of a plurality of hops in the route, encrypting in a single ciphertext both an address of a preceding mobile computing device in the route and a ciphertext containing mobile computing devices preceding the preceding mobile computing device to form multiple layers of encrypted ciphertexts; and at each of the plurality of hops, on a return trip through the route, decrypting one of the multiple layers of encrypted ciphertexts to determine an address of a next hop in the route on the return trip and sending a ciphertext in a next lower layer revealed by decrypting a given layer to the address of the next hop in the route.

20. A method comprising: the operations of any one of embodiments 1-19.

21. A system, comprising: one or more processors; and memory storing instructions that when executed by the processors cause the processors to effectuate operations comprising: the operations of any one of embodiments 1-19

What is claimed is:

1. A non-transitory, machine-readable medium storing instructions that when executed by one or more processors of a first mobile computing device effectuate operations comprising:

obtaining, using a client-side geolocation analytics application executed by the one or more processors of the first mobile computing device, geolocation data of the first mobile computing device and a profile of a user of the first mobile computing device;

generating a first request that identifies a first geographic area related to the geolocation data;

transmitting the first request from the first mobile computing device to a server-side geolocation analytics application via a network, wherein the first request is transmitted from the first mobile computing device to the server-side geolocation analytics application via one or more relay modules in each of a respective one or more peer mobile computing devices, wherein each of the respective one or more peer mobile computing devices is equipped with the client-side geolocation analytics application;

receiving, with the first mobile computing device, via the network, from the server-side geolocation analytics application, data comprising a subset of a global base map containing the first geographic area that was identified by the first request, wherein the subset of the global base map includes a plurality of geographic areas of places of interest in the first geographic area overlaid on the subset of the global base map, and wherein the plurality of geographic areas of the places of interest are specified in the data with a corresponding plurality of polygons that are each defined with vertices in a latitude-longitude format;

determining, with the client-side geolocation analytics application, a first subset of the plurality of places of interest having respective ones of the plurality of polygons within which the geolocation data exists;

identifying location visits by the first mobile computing device to the first subset of the plurality of places by determining, with the client-side geolocation analytics application, places at which the geolocation data of the first mobile computing device is stationary within one of the plurality of polygons corresponding to a respective one of the plurality of places of interest, identifying exposures by the first mobile computing device to the first subset of the plurality of places by determining, with the client-side geolocation analytics application, places within a threshold distance of a path of travel of the first mobile computing device;

transmitting the location visits and exposures, with the first mobile computing device, via the network, to the server-side geolocation analytics application;

wherein the location visits and exposures are transmitted to the server-side geolocation analytics application without revealing the geolocation data of the first mobile computing device.

2. The medium of claim 1, wherein:

each polygon is associated with designation in an ontology of places of interest indicating a type of the respective place of interest.

3. The medium of claim 1, wherein the operations comprise:

generating, with the client-side geolocation analytics application, a second request for data describing another geographic area that is not indicative of the geolocation of the first mobile computing device; and sending, with the first mobile computing device, via the network, to the server-side geolocation analytics application, a second request for data describing another geographic area.

4. The medium of claim 1, wherein transmitting the first request comprises:

causing the first request to be routed through one or more proxy nodes in a peer-to-peer network to obfuscate a network address of the first mobile computing device.

5. The medium of claim 1, wherein the operations comprise:

randomly sampling from a probability distribution of geolocations; and determining the first geographic area related to the geolocation data from the random sampling.

6. The medium of claim 5, wherein:

the random sampling is a pseudorandom sampling that produces fake geolocations that are not indicative of the geolocation data.

7. The medium of claim 5, wherein:

the probability distribution of geolocations is based on the geolocation data.

8. The medium of claim 1, wherein the operations comprise determining the first geographic area related to the geolocation data based on both the geolocation data and a random value.

9. The medium of claim 1, wherein determining a first geolocation of the geolocation data comprises:

obtaining, with the client-side geolocation analytics application, a plurality of geolocations over time measured by the first mobile computing device;

calculating, with the client-side geolocation analytics application, a centroid of the plurality of the geolocations; and using, with the client-side geolocation analytics application, the centroid as the first geolocation.

10. The medium of claim 1, wherein the operations comprise:

obtaining a plurality of geolocations over time measured by the first mobile computing device; and steps for clustering the plurality of geolocations.

11. The medium of claim 1, wherein the operations comprise:

steps for addressing and routing the first request.

12. The medium of claim 1, wherein the operations comprise:

steps for obfuscating a network address of the first mobile computing device.

13. The medium of claim 1, wherein the operations comprise:

steps for determining a first geolocation of the geolocation data is within a geographic area of a place of interest.

14. A method, comprising:

obtaining, using a client-side geolocation analytics application executing on a first mobile computing device, geolocation data of the first mobile computing device and a profile of a user of the first mobile computing device;

generating a first request that identifies a first geographic area related to the geolocation data;

transmitting the first request from the first mobile computing device to a server-side geolocation analytics application via a network, wherein the first request is transmitted from the first mobile computing device to the server-side geolocation analytics application via one or more relay modules in each of a respective one or more peer mobile computing devices, wherein each of the respective one or more peer mobile computing devices is equipped with the client-side geolocation analytics application;

receiving, with the first mobile computing device, via the network, from the server-side geolocation analytics application, data comprising a subset of a global base map containing the first geographic area that was identified by the first request, wherein the subset of the global base map includes a plurality of geographic areas of places of interest in the first geographic area, and wherein the plurality of geographic areas of the places of interest are specified in the data with a corresponding plurality of polygons that are each defined with vertices in a latitude-longitude format;

determining, with the client-side geolocation analytics application, a first subset of the plurality of places of interest having respective ones of the plurality of polygons within which the geolocation data exists;

identifying location visits by the first mobile computing device to the first subset of the plurality of places by determining, with the client-side geolocation analytics application, places at which the geolocation data of the first mobile computing device is stationary within one of the plurality of polygons corresponding to a respective one of the plurality of places of interest, identifying exposures by the first mobile computing device to the first subset of the plurality of places by determining, with the client-side geolocation analytics application, places within a threshold distance of a path of travel of the first mobile computing device;

transmitting the location visits and exposures, with the first mobile computing device, via the network, to the server-side geolocation analytics application; and updating, with the server-side geolocation analytics application, a portion of a place profile corresponding to places within the first subset of the plurality of places of interest based on the location visits and exposures, wherein the place profile comprises location visits and exposures by multiple mobile computing devices associated with profiles of multiple users that are aggregated to characterize consumer behaviors associated with people that visited a type of location over a period of time;

wherein the location visits and exposures are transmitted to the server-side geolocation analytics application without revealing the geolocation data of the first mobile computing device.

* * * * *